US008511121B2

(12) United States Patent
Tsuruta

(10) Patent No.: US 8,511,121 B2
(45) Date of Patent: Aug. 20, 2013

(54) KEY HOLDING DEVICE FOR IN-VEHICLE AUXILIARY KEY

(75) Inventor: Hiroshi Tsuruta, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 528 days.

(21) Appl. No.: 12/565,847

(22) Filed: Sep. 24, 2009

(65) Prior Publication Data

US 2010/0073130 A1 Mar. 25, 2010

(30) Foreign Application Priority Data

Sep. 24, 2008 (JP) ................................ 2008-244632

(51) Int. Cl.
 *B60R 25/02* (2013.01)
 *E05B 11/00* (2006.01)
 *E05B 47/06* (2006.01)

(52) U.S. Cl.
 USPC ............. 70/337; 70/252; 70/278.3; 70/278.7; 70/283.1; 70/340; 70/389; 340/5.72

(58) Field of Classification Search
 USPC .................. 70/252, 389, 337, 340–343, 390, 70/429, 278.3, 278.7, 279.1, 283.1; 340/5.72, 340/5.7, 5.24, 426.35
 See application file for complete search history.

(56) References Cited

U.S. PATENT DOCUMENTS

| 3,688,861 | A | * | 9/1972 | Lipschultz et al. | 180/287 |
|---|---|---|---|---|---|
| 3,708,032 | A | * | 1/1973 | Suzuki | 180/287 |
| 3,782,493 | A | * | 1/1974 | Lipschutz et al. | 180/287 |
| 3,851,505 | A | * | 12/1974 | Wilkinson | 70/255 |
| 4,119,171 | A | * | 10/1978 | Remontet | 180/287 |
| 4,827,744 | A | * | 5/1989 | Namazue et al. | 70/252 |
| 4,898,010 | A | * | 2/1990 | Futami et al. | 70/278.1 |
| 5,656,867 | A | * | 8/1997 | Kokubu | 307/10.5 |
| 5,685,183 | A | * | 11/1997 | Hattori et al. | 70/252 |
| 5,982,295 | A | * | 11/1999 | Goto et al. | 340/10.52 |
| 6,546,768 | B1 | * | 4/2003 | Burghoff et al. | 70/252 |
| 6,810,700 | B2 | * | 11/2004 | Okuno | 70/186 |
| 7,302,817 | B2 | * | 12/2007 | Ohtaki et al. | 70/186 |
| 7,545,255 | B2 | * | 6/2009 | Ohtaki et al. | 340/5.72 |
| 7,730,752 | B2 | * | 6/2010 | Yoshitake et al. | 70/252 |
| 7,930,915 | B2 | * | 4/2011 | Katagiri | 70/252 |

(Continued)

FOREIGN PATENT DOCUMENTS

FR     2 499 006     8/1982
JP     63-130878 A     6/1988

(Continued)

*Primary Examiner* — Lloyd Gall
(74) *Attorney, Agent, or Firm* — Duane Morris LLP; J. Rodman Steele, Jr.; Gregory M. Lefkowitz

(57) ABSTRACT

A key holding device includes a key cylinder capable of retaining an auxiliary key which is a vehicle key that is not a master key. A rotor is rotatably arranged in the key cylinder. The auxiliary key is insertable into the rotor. A tumbler is rotatable with the rotor in the key cylinder. The tumbler holds the auxiliary key in a manner irremovable from the key cylinder in accordance with the rotational position of the rotor. A key lock mechanism is capable of locking the rotor in a state in which the tumbler holds the auxiliary key in a manner irremovable from the key cylinder. A control unit selectively switches the rotor between a locked state and an unlocked state by controlling the key lock mechanism so as to permit removal of the auxiliary key when the rotor is in the unlocked state.

9 Claims, 10 Drawing Sheets

(56) References Cited

U.S. PATENT DOCUMENTS

| | | | |
|---|---|---|---|
| 8,011,214 B2 * | 9/2011 | Katagiri et al. | 70/252 |
| 8,028,552 B2 * | 10/2011 | Ko et al. | 70/252 |
| 8,069,694 B2 * | 12/2011 | Nakamoto | 70/186 |
| 2003/0015006 A1 * | 1/2003 | Tamukai | 70/186 |
| 2008/0024270 A1 * | 1/2008 | Katagiri | 340/5.72 |
| 2009/0309696 A1 * | 12/2009 | Tsuruta et al. | 340/5.22 |
| 2010/0071427 A1 * | 3/2010 | Tsuruta | 70/237 |

FOREIGN PATENT DOCUMENTS

| | | |
|---|---|---|
| JP | 2002180711 A | 6/2002 |
| JP | 2004-025936 | 1/2004 |
| JP | 2004190381 A | 7/2004 |

* cited by examiner

Unlock Position

Unlock Position

Lock Position

Unlocked State

Lock Position

Unlock Position

Lock Position

Fig.15

LIST OF FUNCTION RESTRICTIONS FOR EACH LEVEL OF ASSIST KEY SYSTEM

| Restricted Particulars | Level | | | |
|---|---|---|---|---|
| | Lv.1 | Lv.2 | Lv.3 | Lv.4 |
| Glove Box SW (Steering Wheel) Operation | × | × | × | × |
| ① Travel Distance | | | | × |
| ② Travel Velocity | | | | × |
| ③ Car Navigation Operation | | | × | × |
| ④ Trunk SW Operation | | | × | × |
| ⑤ Fuel Filler SW Operation | | | × | × |
| ⑥ Console Box SW Operation | | | | × |
| ⑦ Seat Memory SW Operation | | × | × | × |
| ⑧ Rear Air Conditioner SW Operation | | | × | × |
| ⑨ Vehicle Phone Operation | | | × | × |
| ⑩ ETC Operation | | | × | × |
| ⑪ G-BOOK Operation | | | × | × |

Fig.16

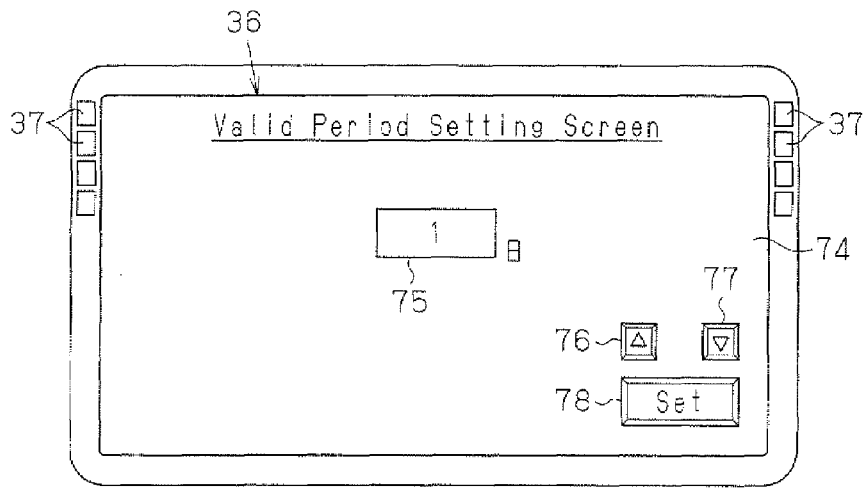

KEY HOLDING DEVICE FOR IN-VEHICLE AUXILIARY KEY

CROSS-REFERENCE TO RELATED APPLICATIONS

This application is based upon and claims the benefit of priority from prior Japanese Patent Application No. 2008-244632, filed on Sep. 24, 2008, the entire contents of which are incorporated herein by reference.

BACKGROUND OF THE INVENTION

The present invention relates to a key holding device enabling selective removal of an auxiliary key that serves as a vehicle key normally stored in a vehicle.

In the prior art, various types of vehicle lending systems have been proposed to lend a vehicle to a third person in a state in which conditions for use of the vehicle are restricted. For example, if a vehicle is lent to a third person in a state in which the vehicle may be freely used, the third person may use the vehicle as he or she desires. Japanese Laid-Open Patent Publication No. 2004-25936 describes one example of a vehicle lending system in the prior art. The publication describes a technique in which restrictions are imposed for driving a vehicle when using a sub-key but not when using a master key. When lending the vehicle to a third person, the user gives the sub-key to the third person so as that the vehicle is used under restricted conditions.

In the vehicle lending system of the above-described publication, the master key and the sub-key must both be carried by the user. This is inconvenient since the user must carry more items. Further, for example, if the vehicle must be lent to a third person when the user is not carrying the sub-key, the user must go and find the sub-key. This is also inconvenient to the user.

Therefore, other types of vehicle lending systems, such as an assist key system, have been developed. In an assist key system, a vehicle key (hereinafter referred to as the assist key) that allows use of a vehicle under restricted conditions is normally stored in a vehicle. When lending the vehicle to a third person, the user gives the assist key to the third person to permit usage of the vehicle under restricted conditions. The assist key serves as a sub-key, which is described above, and includes a key code, which sets the restricted conditions for usage of the vehicle. In this case, there is no need for the user to hold two types of vehicle keys. This increases convenience for the user.

In this type of assist key system, the assist key is stored, for example, in a glove box, which is located in the passenger compartment. In this case, for example, the assist key is inserted into a key slot that is formed in the glove box. In a state inserted in the key slot, if the assist key were to be freely removable, anyone would be able to freely remove the assist key from the key slot. This lowers security and may result in the key being stolen. It is therefore preferable that the key slot include a key holding device (key lock-unlock device) that locks the assist key so that it cannot be removed from the key slot. In this case, when the vehicle permits lending of the assist key, it is preferable that the key holding device be unlocked so that the assist key is removable.

If a key holding device was to have a complicated structure and components costs were to be increased, this would cause many obstacles for arrangement of the key holding device in a vehicle. Thus, there is a demand for a key holding device having a simple and inexpensive structure.

SUMMARY OF THE INVENTION

The present invention provides a key holding device with a simplified structure that holds an auxiliary key in an irremovable state when removal is not permitted.

One aspect of the present invention is a key holding device for an in-vehicle auxiliary key. The key holding device includes a key cylinder capable of retaining the auxiliary key which is a vehicle key that is not a master key. A rotor is rotatably arranged in the key cylinder. The auxiliary key is insertable into the rotor. A tumbler is rotatable with the rotor in the key cylinder. The tumbler holds the auxiliary key in a manner irremovable from the key cylinder in accordance with the rotational position of the rotor. A key lock mechanism is capable of locking the rotor in a state in which the tumbler holds the auxiliary key in a manner irremovable from the key cylinder. A control unit selectively switches the rotor between a locked state and an unlocked state by controlling the key lock mechanism so as to permit removal of the auxiliary key when the rotor is in the unlocked state.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 15 is a chart showing a list of function restrictions that is in accordance with the assist key level;

FIG. 16 is an exemplary diagram showing a valid period setting screen; and

DETAILED DESCRIPTION OF THE PREFERRED EMBODIMENTS

Figure 1:
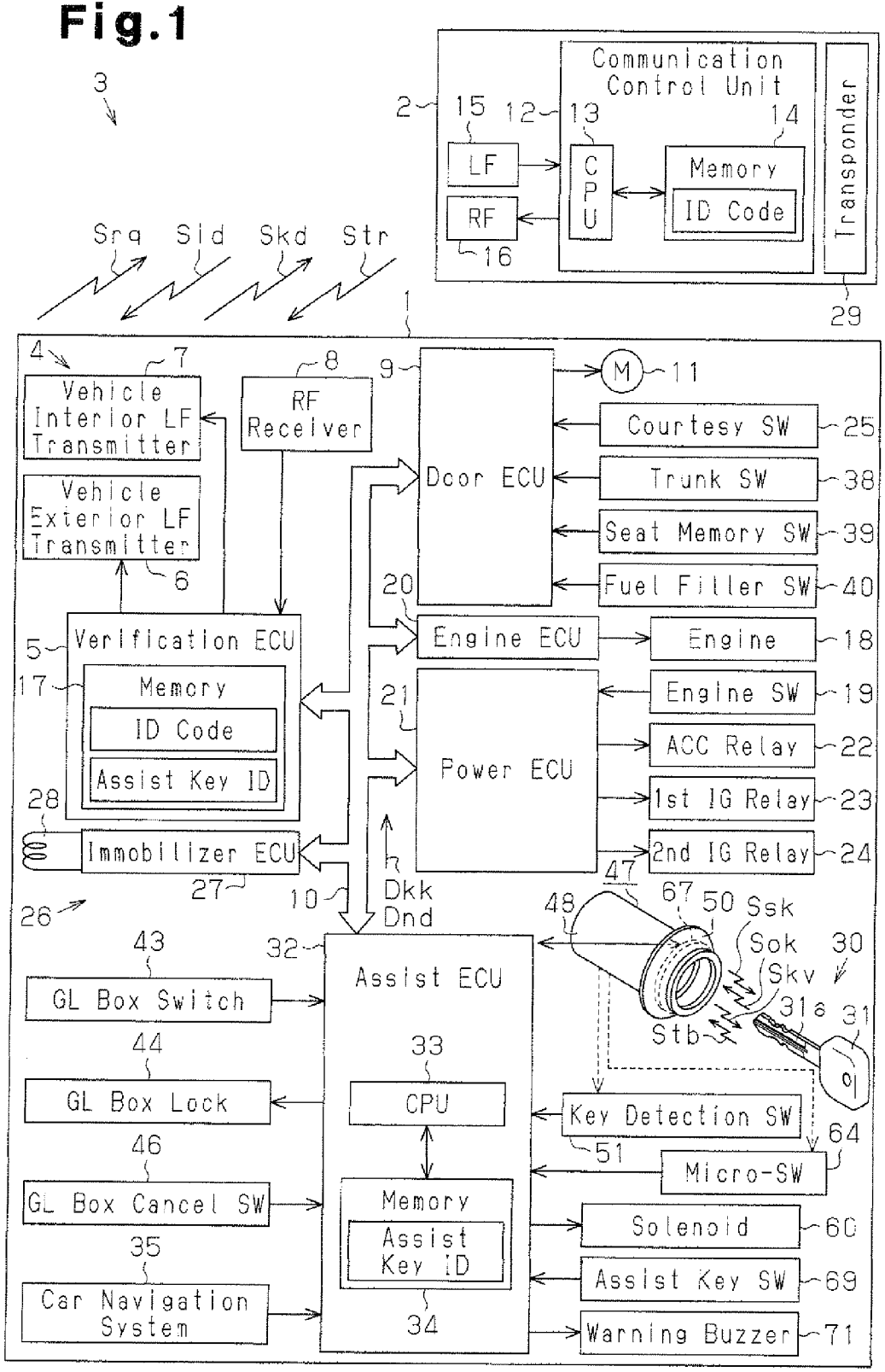
FIG. 1 is a schematic block diagram showing one embodiment of an assist key system.

In the drawings, like numerals are used for like elements throughout.

A preferred embodiment of a key holding device according to the present invention will now be discussed with reference to FIGS. 1 to 17.

As shown in FIG. 1, a vehicle 1 includes an electronic key system 3, which verifies an electronic key 2 that serves as a vehicle key. Under the condition that verification is successful, the electronic key system 3 permits or performs, for example, door locking and unlocking or engine starting. One type of an electronic key system 3 is a key-operation-free system 4 in which the electronic key 2 transmits an ID code without the need for a user to perform a key operation. The electronic key 2 performs a narrowband wireless communication with the vehicle 1 to transmit a unique key code of the electronic key 2 to the vehicle 1. As a result, the vehicle 1 performs key verification. The electronic key 2 corresponds to a master key.

The key-operation-free system 4 includes a smart entry system in which a key operation does not have to be performed to lock and unlock the doors. The smart entry system includes a verification electronic control unit (ECU) 5, which is arranged in the vehicle 1 and performs verification (ID verification) on the electronic key 2. The verification ECU 5 is connected to a vehicle exterior LF transmitter 6, which transmits signals in an LF band (low frequency of about 130 kHz) to the exterior of the vehicle, a vehicle interior LF transmitter 7, which transmits signals in the same LF band to the interior of the vehicle, and an RF receiver 8, which receives signals in an RF band (radio frequency of about 312 MHz). Further, the verification ECU 5 is connected to a door ECU 9, which controls the locking and unlocking of the doors, by an in-vehicle local area network (LAN) 10. The door ECU 9 is connected to a door lock motor 11, which serves as a drive source when locking and unlocking the doors. The verification ECU 5, the LF transmitters 6 and 7, and the RF receiver 8 form a verification unit.

The electronic key 2 includes a communication control unit 12, which controls various types of operations for the electronic key 2. The communication control unit 12 includes a central processing unit (CPU) 13 and a memory 14. An ID code, or unique key code, of the electronic key 2 is registered in the memory 14. The communication control unit 12 is connected to an LE receiver 15, which receives wireless signals in the LE band, and an RE transmitter 16, which transmits wireless signals in a low RE band (about 312 MHz). The communication control unit 12 monitors the type of wireless signal received by the LE receiver 15 and manages signal transmissions from the PT transmitter 16.

When the vehicle 1 is in a parked state, the verification ECU 5 intermittently transmits a request signal Srq in the LF band from the vehicle exterior LE transmitter 6, forms a vehicle exterior communication area of the request signal Srq around the vehicle (within a few meters), and attempts to establish narrowband wireless communication (hereinafter referred to as smart communication). When the electronic key 2 enters the Vehicle exterior communication area and receives the request signal Srq, in response to the request signal Srq, the electronic key 2 generates an ID signal Sid including the ID code of the electronic key 2 registered in its memory 14 and returns the ID signal Sid in the RE band. Then, the verification ECU 5 performs ID verification, or the so-called smart verification (vehicle exterior verification authentication), by comparing the ID code of the electronic key 2 with the ID code registered in its memory 17. When the vehicle exterior verification is successful, the verification ECU 5 permits or performs locking or unlocking of the doors with the door ECU 9.

The key-operation-free system 4 includes a one-push engine start system for permitting the engine 18 to be started or stopped just by performing a switch operation. This eliminates the need for an actual vehicle key operation when starting or stopping the engine. The one-push engine start system includes an engine switch 19, which serves as an operation unit for the engine start system. The engine switch 19 is, for example, of a momentary push type. In addition to the function for starting and stopping the engine 18, the engine switch 19 includes, for example, a power switching function for switching the power state of the vehicle 1 whenever the engine switch 19 is operated.

The vehicle 1 also includes an engine ECU 20, which controls the engine 18, and a power ECU 21, which controls various types of electrical devices installed in the vehicle 1. The ECUs 20 and 21 are connected to other ECUs including the verification ECU 5 via the in-vehicle LAN 10. Further, the power ECU 21 is connected to an accessory (ACC) relay 22, which is connected to in-vehicle accessories, a first ignition (IG) relay 23, which is connected to various electrical devices of the vehicle driving system, and a second IC relay 24, which is connected to the ECU 20 and a starter relay.

A courtesy switch 25 may be used to determine if the driver has entered the vehicle. In this case, the verification ECU 5 starts to transmit a request signal Srq from the vehicle interior LF transmitter 7 instead of the vehicle exterior LF transmitter 6 so as to form a vehicle interior communication area in the entire passenger compartment of the vehicle. In response to the request signal Srq in the vehicle interior communication area, the electronic key 2 returns an ID signal Sid. When the RE receiver 8 receives the ID signal Sid, the verification ECU 5 compares the ID code of the electronic key 2 with the ID code registered therein to perform ID verification, or the so-called smart verification (in-vehicle verification). When the in-vehicle verification is successful, the verification ECU 5 permits engine starting and power switching with the engine switch 19.

The electronic key system 3 also includes an immobilizer system 26, which is installed in the vehicle 1. The immobilizer system 26 verifies the electronic key 2 through a communication system, which differs from that used for the smart communication. The immobilizer system 26 performs, for example, radio frequency identification (REID) through near-field wireless communication (hereinafter referred to as immobilizer communication). The immobilizer system 26 includes an immobilizer ECU 27, which controls the immobilizer system 26. The immobilizer ECU 27 is connected to the verification ECU 5 by the in-vehicle LAN 10. The immobilizer ECU 27 is connected to a coil type immobilizer antenna 28, which serves as a vehicle side antenna for the immobilizer system 26. The immobilizer antenna 28 is arranged, for example, near the engine switch 19 and receives LF band signals.

The immobilizer system 26 further includes a transponder 29, which is installed in the electronic key 2. The ID of the electronic key 2 is registered in the transponder 29. Drive radio waves Skd transmitted from the immobilizer antenna 28 activates the transponder 29. Then, the transponder 29 transmits an immobilizer signal Str that includes a transponder code (key code), which is its unique code, to the vehicle 1. The immobilizes ECU 27 receives the immobilizer signal Str with the immobilizer antenna 28 and permits engine starting when immobilizer verification with the immobilizer signal Str is successful. The near-field wireless communication refers to wireless communication performed in a communication area that is narrower than that for smart communication. To perform near-field wireless communication, the transponder 29 must be held in the vicinity of the immobilizer antenna 22.

The driver pushes the engine switch 29 to start the engine 18. When the engine switch 19 is pushed, if either one of in-vehicle verification and immobilizer verification is successful, the engine ECU 20 starts the engine 18. The electronic key 2 is driven by a battery. Thus, when the battery is drained, the electronic key 2 cannot perform smart communication. However, as long as ID verification, which is performed through near-field wireless communication, is successful, the engine 18 can be started even if the battery of the electronic key 2 is drained.

The vehicle 1 includes an assist key system 30, which sets restriction conditions when using the vehicle 1 with an auxiliary key, which is a vehicle key that differs from the electronic key 2. The auxiliary key of the assist key system 30 is a vehicle key that is referred to as an assist key 31. The assist key 31 is normally stored in the vehicle 1. The assist key system 30 uses the assist key 31 to set a security level that restricts use of the vehicle 1. The security level is associated with the assist key 31 and will hereinafter be referred to as the assist key level. When lending the vehicle to a third person, the user sets the assist key level and then gives the assist key to the third person so as that the vehicle can be used under restricted conditions in accordance with who the third person is. The assist key level may be changed whenever lending the vehicle 1. Otherwise, the assist key level may be fixed.

The assist key system 30 will now be discussed in detail. The assist key system 30 includes an assist ECU 32, which serves as a control unit. The assist ECU 32 includes various types of device elements such as a CPU 33 and a memory IROM, RAM) 34. Further, the ECU 32 is connected to other ECUs including the verification ECU 5 by the in-vehicle LAN 10. The assist ECU 32 is formed by an exclusive PC board (substrate) on which various types of device elements such as the CPU 33 and the memory 34 are mounted. The assist ECU 32 functions as a rotational position checking unit and a restriction unit.

The assist ECU 32 is connected to an in-vehicle car navigation system 35, which serves as an electronic device that indicates the present location of the vehicle 1 and presents a route along which the vehicle 1 is guided to a destination. The car navigation system 35 includes, for example, a touch panel type display 36 and various input switches 37, which serve as an input system that differs from the touch panel type (refer to FIG. 2). The car navigation system 35 uses the Global Positioning System (GPS) to find the present position of the vehicle 1 and shows the present position and route to a destination on a screen, which is shown on a display 36. The display 36 and the input switches 37 also function as an input system and display system for the assist key system 30 and are thereby shared with the assist key system 30. In one example, the assist key ECU 32, the display 36, and the input switches 37 function as a restriction setting unit.

Referring to FIG. 1, the vehicle 1 includes a trunk switch 38, a seat memory switch 39, and a fuel filler switch 40. The trunk switch 38 is operated to open the trunk. The seat memory switch 39 is operated to register a driver seat position. The fuel filler switch 40 is operated to open the fuel filler lid. These switches 38 to 40 are connected to the ECU 9 by electrical wires, and the ECU 9 monitors operation of the switches 38 to 40. Further, in response to instructions from the assist ECU 32, the door ECU 9 manages the validation and invalidation of the operation of the switches 38 to 40 in accordance with the present restriction state of the vehicle 1.

Figure 2:
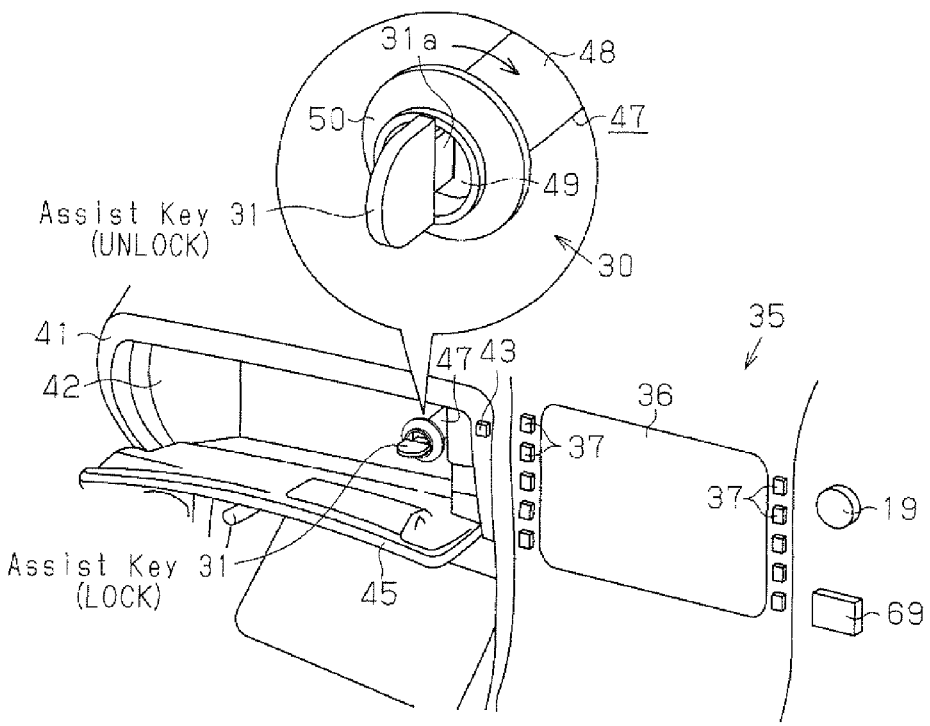
FIG. 2 is a perspective view showing the periphery, interior, and outer appearance of a glove box.

Referring to FIG. 2, in front of the passenger seat of the vehicle 1, a dashboard 41 includes a glove box 42, which serves as an accommodation compartment arranged in the dashboard 41. As shown in FIGS. 1 and 2, the glove box 42 includes a glove box switch 43, which is operated to open the glove box 42. The glove box switch 43, which is, for example, a push-operation type momentary switch, is electrically connected to the assist ECU 32. The glove box 42 also includes a glove box lock 44 (refer to FIG. 1) to lock the glove box 42 in a closed state. The glove box lock 44 includes a latch and striker, which mechanically cooperate with each other. When moving a lid 45 to close the glove box 42, the striker pushes and moves the latch against the urging force of an urging member not shown) such as a coil spring. When the lid 45 reaches a position where it fully closes the glove box 42, the latch is moved in the opposite direction by the urging member and becomes engaged with the striker. When the glove box 42 is in a closed state, the assist ECU 32 detects pushing of the glove box switch 43 and opens the glove box lock 44. As a result, the lid 45 of the glove box 42 is pivoted by an urging member (not shown) such as a torsion spring toward an open position to open the glove box 42.

As shown in FIG. 1, the vehicle 1 includes a glove box cancel switch 46, which is operated to prohibit opening of the glove box 42. The glove box cancel switch 46 is, for example, a push type alternate switch arranged near the driver seat and electrically connected to the assist ECU 32. When the glove box cancel switch 46 is activated, the assist ECU 32 prohibits opening of the glove box 42. In this prohibition state, the glove box 42 remains closed even if the glove box switch 43 is pushed.

Figure 3:
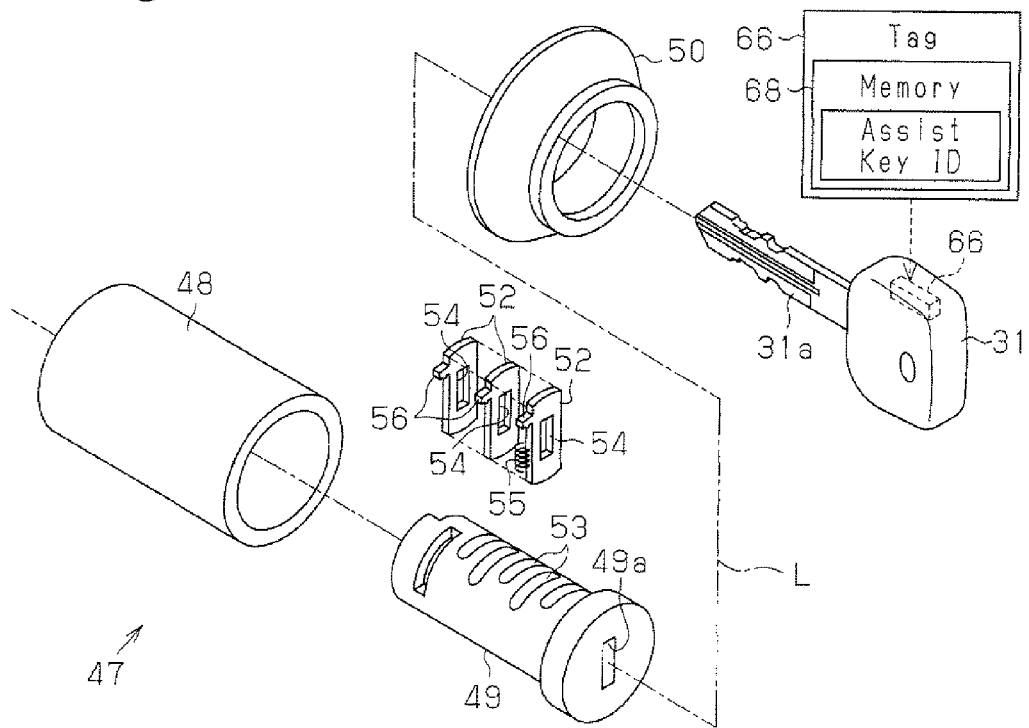
FIG. 3 is a schematic exploded perspective view showing a key cylinder.

As shown in FIGS. 1 to 6, a key cylinder 47, which receives the assist key 31, is arranged in the glove box (refer to FIG. 2). Referring to FIG. 3, the key cylinder 47 includes a cylindrical rotor case 48, which serves as an outer case for the key cylinder 47. The key cylinder 47 is attached to the vehicle 1 by coupling the rotor case 48 to the vehicle body. A generally cylindrical rotor 49 is retained in the rotor case 48 and supported to be rotatable within an angular range of about 90 degrees. A case cover 50 is attached to one end of the rotor case 48 to prevent the rotor 49 from falling out of the case 48.

A key slot 49a, which is used to insert the assist key 31 into the rotor 49, is formed in the front surface of the rotor 49. A key detection switch 51 (refer to FIG. 1) is arranged in the key cylinder 47. The key detection switch 51 serves as a key detection unit for detecting whether or not the assist key 31 has been inserted into the cylinder 47. Further, the key detection switch 51 is electrically connected to the assist ECU 32 and provides the assist ECU 32 with a switch signal indicating whether or not the presence of the assist key 31 has been detected. As shown in FIG. 3, the rotor 49 includes a plurality of tumbler receptacles 53, which are arranged along the rotation axis L of the rotor 49. The tumbler receptacles 53 each retain a tumbler 52 that hinders rotation of the rotor 49. Further, the tumbler receptacles 53 each extend through the rotor 49 in substantially the same direction that is perpendicular to the rotational axis L. In other words, each tumbler receptacle 53 includes two ends (i.e., upper end and lower end) which open in the circumferential surface of the rotor 49. Further, each tumbler receptacle 53 has the form of a narrow slit.

Figure 4:
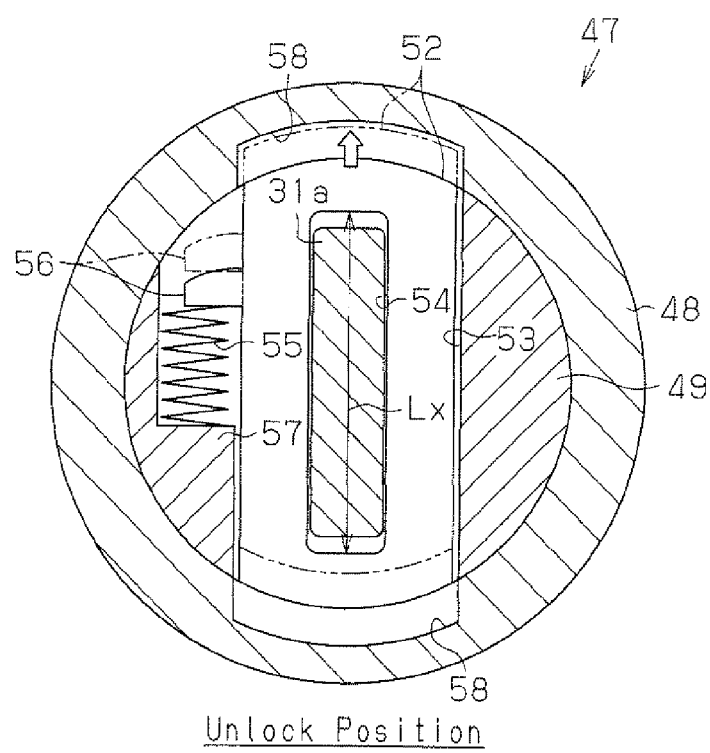
FIG. 4 is a cross-sectional view showing a key cylinder in a state in which a rotor is located at an unlock position.
Figure 5:
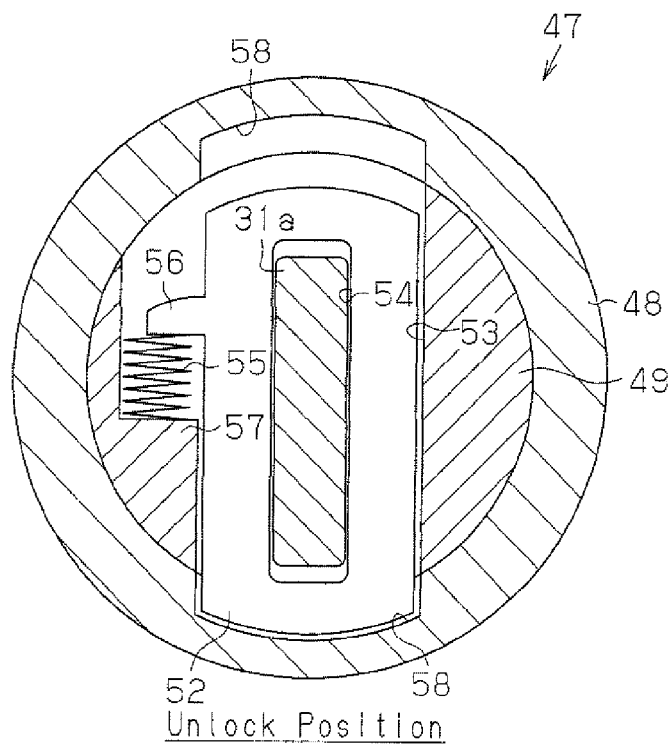
FIG. 5 is a cross-sectional view showing the key cylinder in a state in which the rotor is located at the unlock position.
Figure 6:
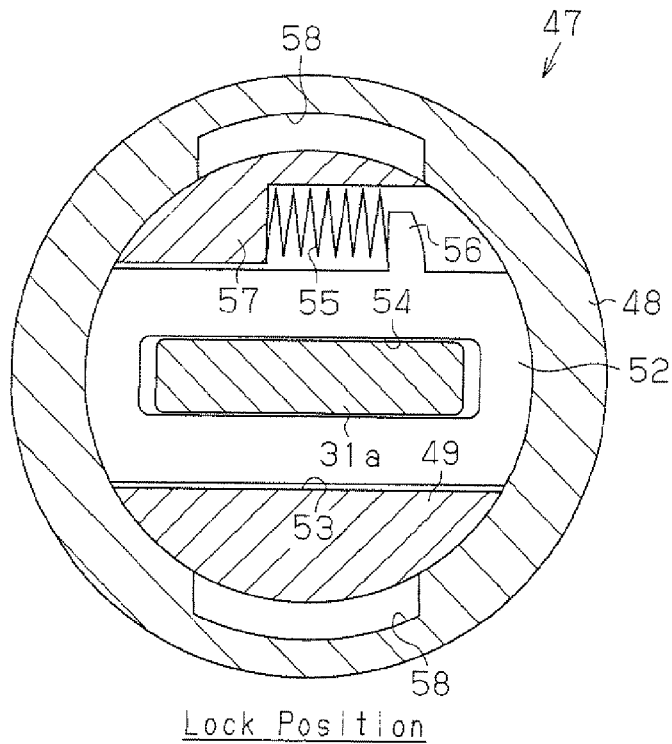
FIG. 6 is a cross-sectional view showing the key cylinder in a state in which the rotor is located at a lock position.

Referring to FIGS. 4 to 6, each tumbler 52 is, for example, a disk tumbler. An insertion hole 54, through which a key plate 31a of the assist key 31 is inserted, extends through the middle of each tumbler 52. When the tumblers 52 are accommodated in the corresponding tumbler receptacles 53, each insertion hole 54 is arranged to extend perpendicular to the rotation axis L of the rotor 49. Each insertion hole 54 has a length (depth) Lx, which corresponds to the length of the key plate 31a in the shorter side direction of the key plate 31a. The key plate 31a has a key groove, which is engageable with a wall of each insertion hole 54. Each tumbler 52 is received in the corresponding tumbler receptacle 53 together with an urging member 55. The urging force of the urging member 55 urges the tumbler 52 outward from the tumbler receptacle 53. The urging member 55 is formed, for example, from a coil spring and has one end hooked to a tab 56 of the tumbler 52 and another end hooked to a seat 57 formed in the rotor 49 in correspondence with the tumbler receptacle 53.

A plurality of clearance recesses 58 are formed in the inner surface of the rotor case 48. Each clearance recess 58 is engageable with either one of the two ends (i.e., upper end and lower end) of each tumbler 52. As shown in FIGS. 4 and 5, when the insertion holes 54 are arranged vertically and come into alignment with the clearance recesses 58, the ends of the tumblers 52 face toward the clearance recesses 58. In this state, the tumblers 52 are movable into the clearance recesses 58. Thus, the tumblers 52 are allowed to move upward and downward. This allows for the assist key 31 to be inserted into and removed from the key cylinder 47. The rotational position of the rotor 49 in which the assist key 31 is insertable into and removable from the cylinder 47 will hereinafter be referred to as an unlock position (or key unlock position). When the rotor 49 is located at the unlock position, the key cylinder 47 (rotor 49) is in a rotatable state. In this state, when the authentic assist key 31 is inserted into the key cylinder 47 and turned, the tumblers 52 are rotated together with the rotor 49 in the rotor case 48.

As shown in the state of FIG. 6, as the insertion holes 54 become arranged sideward with respect to the clearance recesses 58 when the authentic assist key 31 is inserted into the key cylinder 47 and turned in a certain direction (clockwise direction as viewed in FIG. 2), the ends of the tumblers 52 become separated from the clearance recesses 58. In this state, there is no clearance for the tumblers 52. This prohibits removable of the assist key 31 from the key cylinder 47. The rotational position of the rotor 49 when removal of the assist key 31 is prohibited will hereinafter be referred to as a lock position (or key lock position). When the rotor 49 is located at the lock position, the key groove in the key plate 31a of the assist key 31 remains engaged with the tumblers 52. Thus, the assist key 31 cannot be removed from the key cylinder 47.

Figure 7:
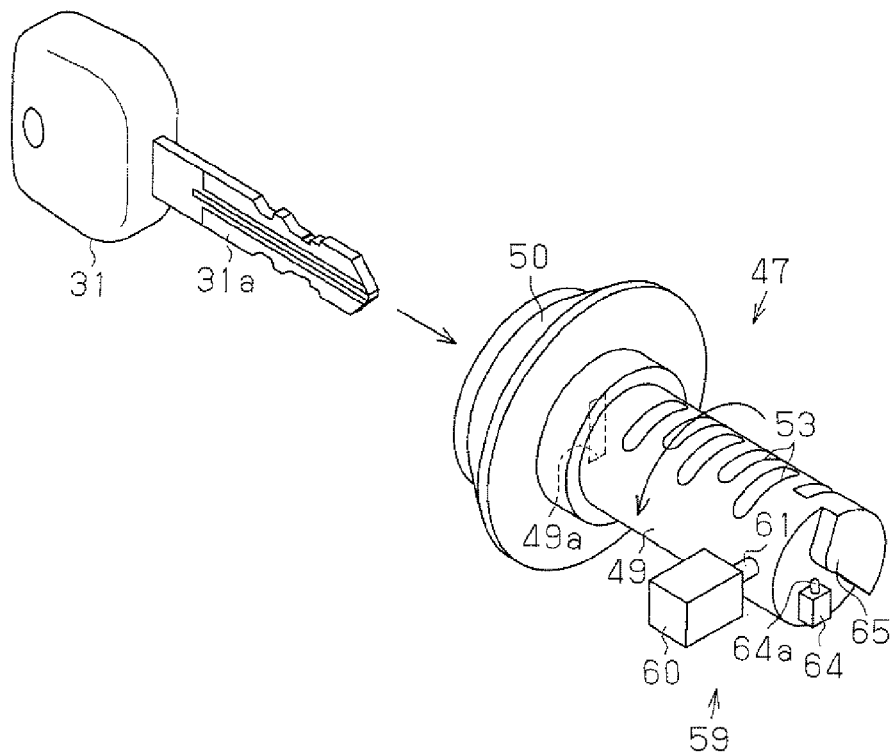
FIG. 7 is a perspective view showing a rotational position holding mechanism from the rear side of the key cylinder.
Figure 8:
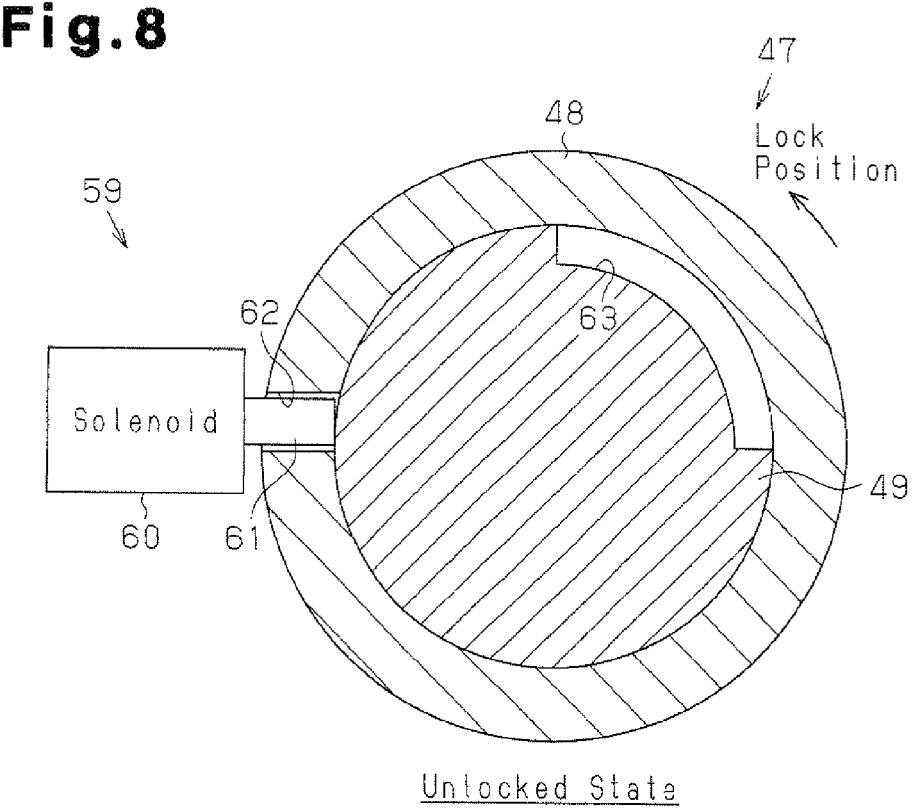
FIG. 8 is a cross-sectional view showing the rotor in an unlocked state from the rear side of the key cylinder.
Figure 9:
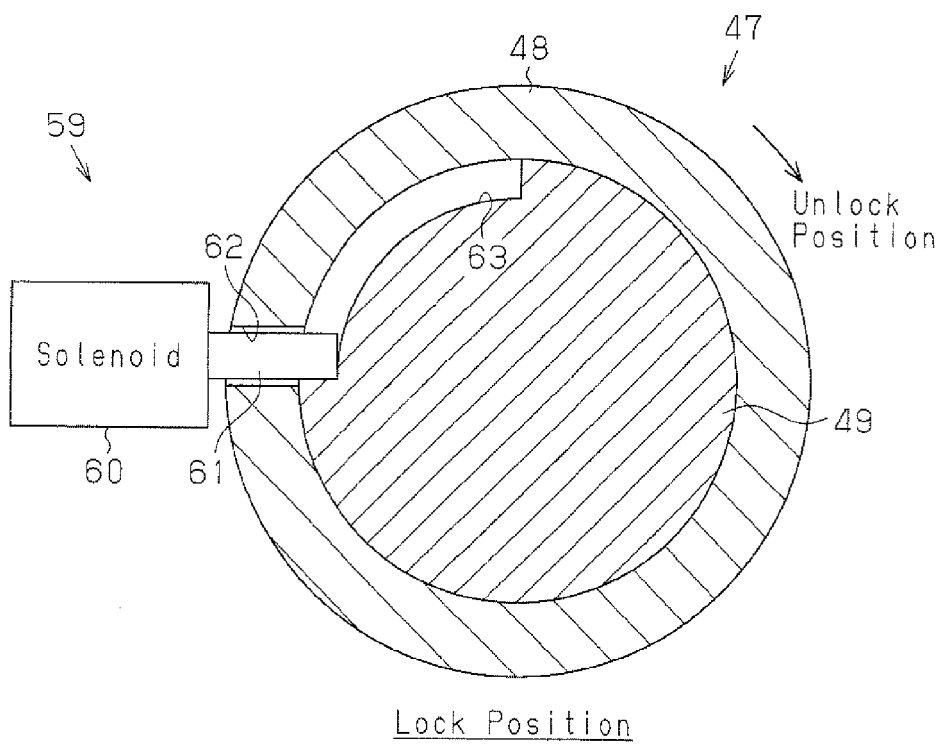
FIG. 9 is a cross-sectional view showing the rotor in a locked state from the rear side of the key cylinder.

Referring to FIGS. 7 to 9, the key cylinder 47 includes a rotational position holding mechanism 59, which is capable of holding the rotor 49 at the lock position when the rotor 49 is rotated to the lock position by the authentic assist key 31. The rotational position holding mechanism 59 includes a solenoid 60, which serves as a drive source for the holding mechanism 39, arranged next to the key cylinder 47. The solenoid 60 is connected by electrical wires to the assist ECU 32, which manages the operation of the solenoid 60. The solenoid 60 is, for example, a pull solenoid, and includes a movable pin 61, which is pulled into the solenoid 60 when supplied with power. When the solenoid 60 is not supplied with power and thereby in a free state, the movable pin 61 is allowed to move (reciprocate) axially. In this state, an urging member (not shown) arranged in the solenoid 60 pushes the movable pin 61 out of the solenoid 60 by a predetermined amount. For example, the movable pin 61 is inserted through a pin hole 62, which extends through the rotor case 48, until reaching the rotor 49. A pocket 63 is formed in the surface of the rotor 49. The movable pin 61 is receivable in the pocket 63. Preferably, the pocket 63 is arcuate and extends in the rotational direction of the rotor 49. The rotational position holding mechanism 59 corresponds to a key lock mechanism.

When the solenoid 60 is activated and the movable pin 61 is pulled inward to the solenoid 60, the movable pin 61 stops restricting rotation of the rotor 49. Thus, the rotor 49 is allowed to rotate freely and becomes unlocked (refer to FIG. 8). In the unlocked state, the rotor 49 may be rotated from the unlock position to the lock position by inserting the assist key 31 into the key cylinder 47. Further, when held at the lock position in the key cylinder 47, the assist key 31 may be turned to rotate the rotor 49 to the unlock position. That is, when the key cylinder 47 (rotor 49) is in an unlock state, the assist key 31 is turnable in the key cylinder 47 between the lock position and the unlock position.

When the rotor 49 is located at the lock position, the solenoid 60 is deactivated, and the movable pin 61 is pushed out, the distal end of the movable pin 61 becomes engaged with one end of the pocket 63. In this locked state, the rotor 49 cannot be rotated toward the unlock position (refer to FIG. 9). That is, when held at the lock position in the key cylinder 47, the assist key 31 cannot be turned to return to the unlock position. Therefore, the position of the key cylinder 47 (rotational position of the rotor 49) is held at the lock position at which the authentic assist key 31 cannot be removed from the key cylinder 47.

Figure 10:
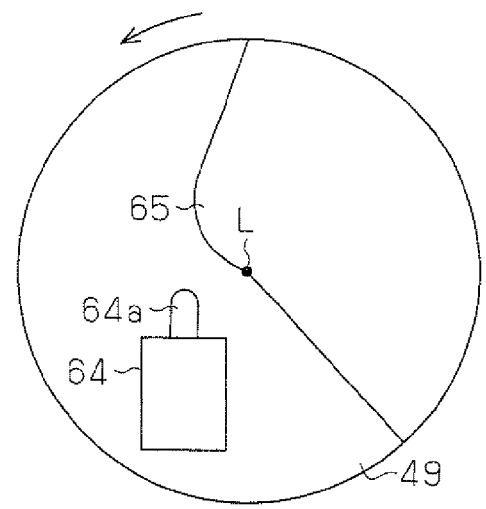
FIG. 10 is a rear view showing the key cylinder in a state in which the rotor is located at the unlock position.
Figure 11:
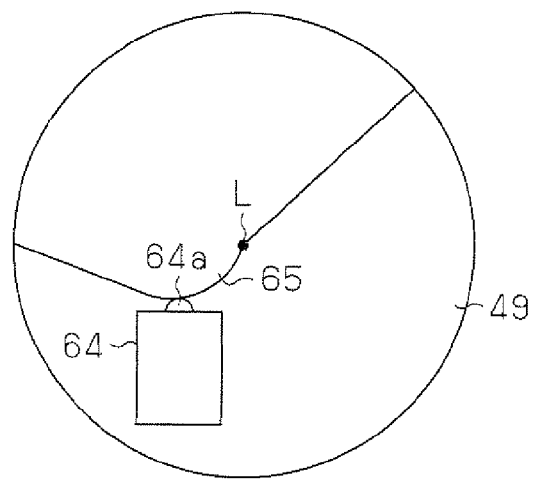
FIG. 11 is a cross-sectional view showing the key cylinder in a state in which the rotor is located at the lock position.
Figure 12:
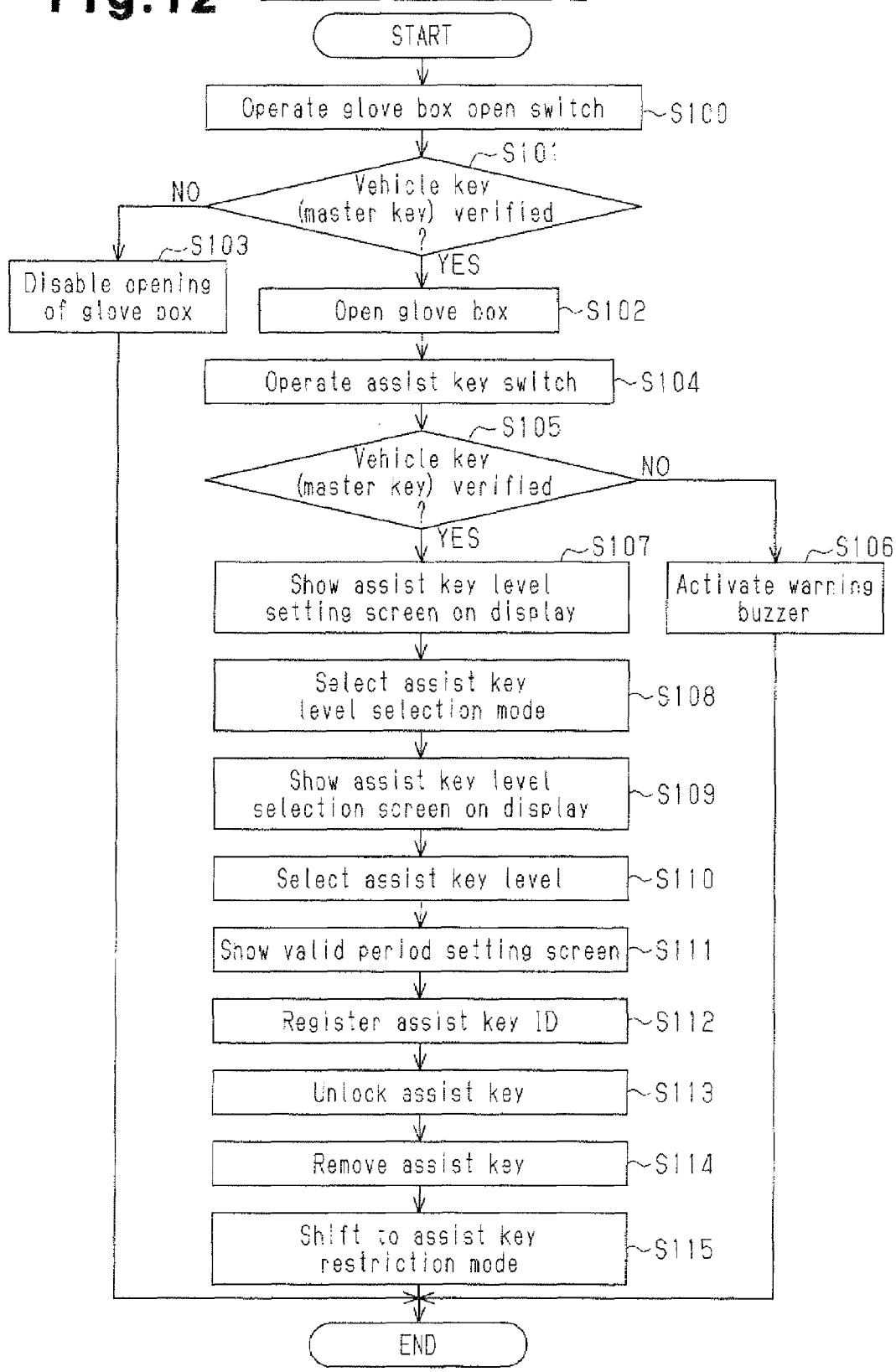
FIG. 12 is a flowchart schematically showing a process performed when lending an assist key.
Figure 13:
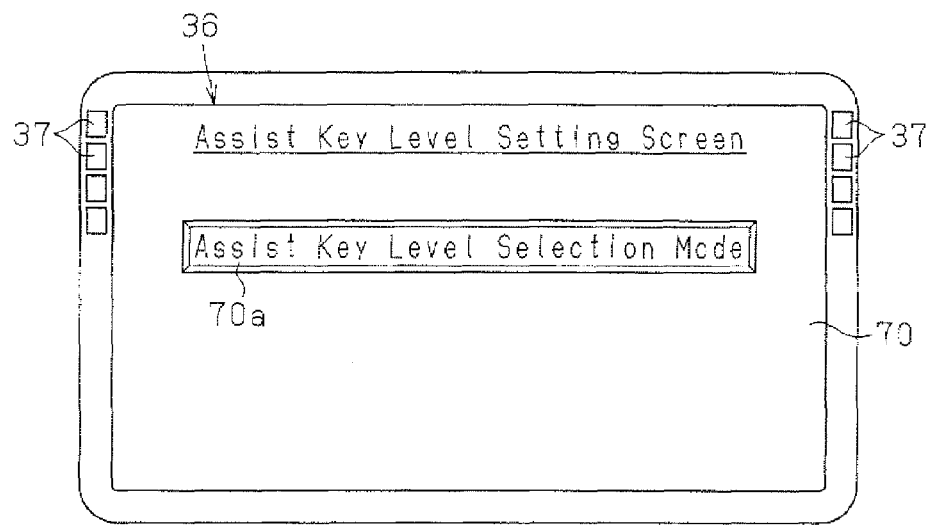
FIG. 13 is an exemplary diagram showing an assist key level setting screen.

Referring to FIGS. 7, 10, and 11, a micro-switch 64 is arranged at the rear side of the key cylinder 47 to detect whether the rotor 49 of the key cylinder 47 is located at the lock position or the unlock position. The micro-switch 64, which is connected to the assist ECU 32 by electrical wires, provides the assist ECU 32 with a detection signal. A detected projection 65, which projects from a rear surface of the rotor 49, has the form of a cam so that it can push a switch contact 64a of the micro-switch 64. The micro-switch 64 corresponds to a rotational position detection unit.

Referring to FIG. 10, when the rotor 49 of the key cylinder 47 is located at the unlock position, the detected projection 65 is separated from the micro-switch 64 and thus not in contact with the switch contact 61a. In this state, the micro-switch 64 is deactivated and the assist ECU 32 is thus provided with an OFF signal. Referring to FIG. 11, when the rotor 49 is rotated to the lock position by the assist key 31, the detected projection 65 pushes the switch contact 64a of the micro-switch 64. This activates the micro-switch 64 and provides the assist ECU 32 with an ON signal. The assist ECU 32 determines whether the key cylinder 47 is located at the lock position or the unlock position based on the detection signal (ON signal or OFF signal) from the micro-switch 64.

Referring to FIGS. 1 and 3, in the same manner as the electronic key 2, the assist key 31 is formed by implementing the electronic key function in a mechanical key. In the same manner as the transponder 29 used in the immobilizer system 26, the assist key 31 includes an ID tag 66 (refer to FIG. 3). The ID tag 66 is capable of performing wireless communication with the vehicle 1 (key cylinder 47) through a communication format that is in compliance with RFID. An assist key ID is registered in the ID tag 66 as a unique key code of the assist key 31. The assist key ID includes a code string. When the assist key ID is verified by the assist key 31 and the vehicle 1, the vehicle 1 becomes usable with the assist key 31 (for example, under restricted conditions).

Referring to FIG. 1, an immobilizer antenna 67, which serves as a vehicle side antenna for the assist key system 30, is arranged in the key cylinder 47 (case cover 50). The immobilizer antenna 67, which includes an antenna wire wound around the key slot 49a, is electrically connected to the assist ECU 32. The ID tag 66 is capable of performing bidirectional wireless communication, which is in compliance with RFID communication, with the immobilizer antenna 67. The immobilizer antenna 67 transmits an ID registration signal Ssk, which includes the assist key ID. When receiving the ID registration signal Ssk, the ID tag 66 registers the assist key ID included in the ID registration signal Ssk in its memory 68 (refer to FIG. 3) so that the assist key 31 functions as a vehicle key. The ID registration signal Ssk includes the assist key ID and drive radio waves for activating the tag 66. When registration of the assist key ID to the memory 68 is completed in a normal manner, the ID tag 66 transmits a registration completion notification Sok with a signal in the LF band and notifies the vehicle 1 of the ID registration completion.

The key cylinder 47 includes an assist key switch 69, which is operated when removing the assist key 31 from the key cylinder 47. The assist key switch 69, which is formed, for example, by a push type momentary switch, is electrically connected to the assist ECU 32. When the assist key switch 69 is pushed, the assist ECU 32 shows an assist key level setting screen 70 (refer to FIG. 13) on the display 36 of the car navigation system 35 so that the user can set an assist key level. When the setting of the assist key level is completed, the assist ECU 32 associates the set assist key level with the assist key ID and registers the assist key ID in the assist key 31. After the ID registration, the assist ECU 32 switches the key cylinder 47 (rotor 49) from a locked state to an unlocked state and allows for the assist key 31 to be removed from the key cylinder 47.

The operation of the assist key system 30 will now be discussed with reference to FIGS. 12 to 17.

First, a case in which an authorized user of the vehicle 1 lends the vehicle 1 to a third person in a state in which the vehicle 1 may be used under restricted conditions will be discussed. The glove box 42 is closed, and the assist key 31 is inserted into the key cylinder 47. The rotor 49 of the key cylinder 47 is held in a locked state at the lock position. More specifically, the movable pin 61 is projected out of the solenoid 60 and caught in the pocket 63 of the rotor 49 so as to maintain the rotor 49 in a state in which rotation is prohibited. Thus, the assist key 31 still cannot be removed from the key cylinder 47.

When lending the vehicle 1 to a third person, the user enters the vehicle 1 while holding the electronic key 2 (master key). Then, referring to the flowchart of FIG. 12, the user reaches out his or her hand from the driver seat to the glove box switch 43 to remove the assist key 31 from the glove box 42 (step 100). This operation of the switch 43 is performed to set the operation mode of the assist key system 30 in an assist key restriction mode (lending mode under restricted conditions), which is a system execution state. When the glove box switch 43 is pushed, the assist ECU 32 obtains the result of the in-vehicle verification (or immobilizer verification) from the verification ECU 5 (step 101). If the verification ECU 5 indicates that the in-vehicle verification was successful, the assist ECU 32 operates the glove box lock 44 to open the glove box 42 (step 102). On the other hand, if the verification ECU 5 indicates that the in-vehicle verification was successful, the assist ECU 32 does not operate the glove box lock 44 and keeps the glove box 42 closed (step 103). Thus, the glove box 42 remains closed even if a third person who is not carrying the electronic key 2 attempts to open the glove box 42. For example, a person may attempt to open the glove box 42 to remove an item from the glove box 42 instead of the assist key 31. In this case, the result of the in-vehicle verification from the verification ECU 5 is obtained when the glove box switch 43 is pushed. Thus, a high level of security is ensured.

After the glove box 42 opens, the user pushes the assist key switch 69 (step 104). When the assist key switch 69 is pushed, the assist ECU 32 activates the assist key level setting function so that the user can set the assist key level. When activating the assist key level setting function, the assist ECU 32 obtains the result of the in-vehicle verification (or immobilizer verification) from the verification ECU 5 (step 105). If the verification ECU 5 indicates that the in-vehicle verification was not successful, a warning buzzer 71 issues a warning sound to deter unauthorized removal of the assist key 31 by a third person (step 106).

If the in-vehicle verification has been successful when the assist key switch 69 is pushed, the assist ECU 32 shows the assist key level setting screen 70 (FIG. 13) on the display 36 of the car navigation system 35 (stop 107). The assist key level setting screen 70 includes a level selection mode execution button 70a, which is a touch button operated to select an assist key level selection mode. To set the assist key level, the user touches the level selection mode execution button 70a and selects the assist key level selection mode (step 108).

Figure 14:
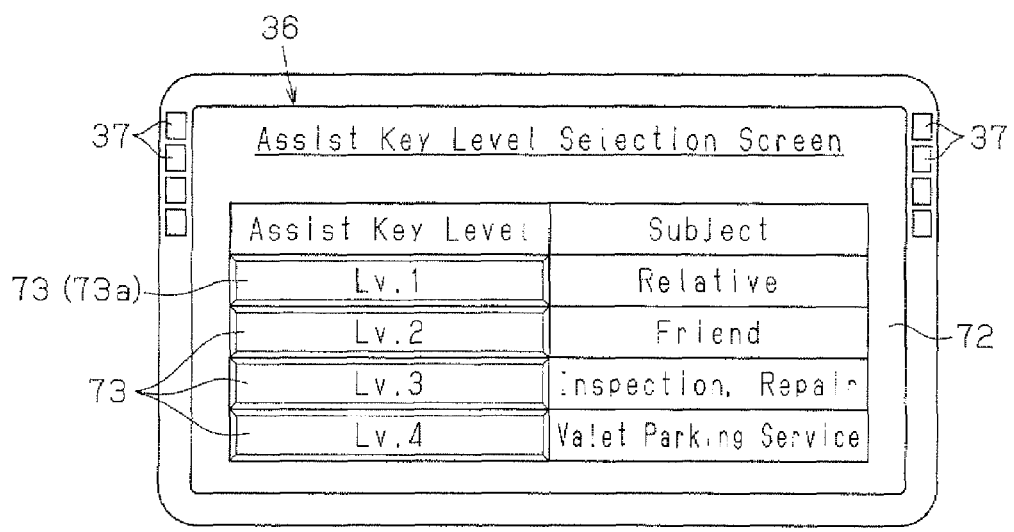
FIG. 14 is an exemplary diagram showing an assist key level selection screen.

When the assist key level selection mode is selected from the assist key level setting screen 70, the assist ECU 32 shows an assist key level selection screen 72, which is shown in FIG. 14, on the display 36 of the car navigation system 35 (step 109). The assist key level selection screen 72 includes a plurality of level selection buttons 73, which are touch buttons operated to select one of a plurality of assist key levels. When the display 36 is of a touch panel type, the level selection buttons 73 are arranged in accordance with screen coordinates of the display 36. The user designates and touches one of the level selection buttons 73 shown on the display 36 to set an assist key level.

Referring to FIG. 15, the assist key levels are given numerical values that become higher as the security level becomes higher. In other words, as the security level becomes higher, the use of more vehicle functions is restricted. Assist level 1 is set for a case in which the person (subject) to whom the vehicle is lent is a relative such as a family member and, for example, permits the use of each vehicle function except for the opening of the glove box 42. Assist level 2 is set for a case in which the person to whom the vehicle 1 is lent is a friend and, for example, permits the use of each vehicle function except for the opening of the glove box 42 and the driver seat position memory operation. Assist level 3 is set for a case in which the person to whom the vehicle 1 is lent is a mechanic who repairs or inspects the vehicle and, for example, permits the use of only the vehicle functions related to the vehicle driving system and the opening of the fuel filler lid. Assist level 4 is set for a case in which the person to whom the vehicle 1 is lent is a hotel employee such as when using valet parking service and permits the use of the vehicle 1 in a state in which the traveling distance and traveling velocity is restricted to a predetermined limit value.

When lending the vehicle 1 to a third person, the user touches the level selection button 73 corresponding to the person to whom the vehicle 1 is lent (step 110). For example, when lending the vehicle 1 to a relative, the user touches the assist key level selection screen 72 at a location corresponding to where the first level selection button 73a is shown to select an assist key level.

After the assist key level is selected with the assist key level selection screen 72, the assist ECU 32 operates as a valid period setting unit and shows a valid period setting screen 74 (FIG. 16) on the display 36 (step 111). The valid period setting screen 74 includes a valid period input box 75, which is for inputting a numerical value indicating the valid period. The user touches an upward arrow key 76 and a downward arrow key 77, which are shown on the valid period setting screen 74, to change the numerical value shown in the valid period input box 75. This sets the number of days of the period during which the assist key restriction mode is valid. When the input of the valid period is completed, the user touches a set button 78, which is shown on the valid period setting screen 74, and completes the setting of the assist key level.

In this manner, when the setting of the assist key level is completed, the assist key ECU 32 transmits the ID registration signal Ssk, which includes the assist key ID and the drive radio waves from the immobilizer antenna 67 as a signal in the LF band. Then, the assist key ECU 32 registers the assist key ID to the assist key 31 (step 112). The assist key ID transmitted from the immobilizer antenna 67 is preferably a rolling code that is changed to a different value whenever the assist key system 30 enters the assist key restriction mode, that is, whenever the assist key level is set. The ID tag 66 of the assist key 31, which is activated by the drive radio waves in the ID registration signal Ssk transmitted from the immobilizer antenna 67, registers the assist key ID included in the ID registration signal Ssk as a unique code in its memory 68. In this state, if the assist key ID that was registered when the vehicle 1 was previously lent to a third person, the ID tag 66 rewrites the new ID over the previous ID. When the registration of the assist key ID is completed in a normal manner, the assist key 31 transmits a registration completion notification Sok with a signal in the LF band.

When the immobilizer antenna 67 receives the registration completion notification Sok from the assist key 31, the assist ECU 32 determines that the registration of the assist key ID has been completed in a normal manner. Then, the assist ECU 32 sends assist key information Dkk, which includes the assist key ID registered in the assist key 31 and its valid period, to the verification ECU 5. The verification ECU 5 receives the assist key information Dkk from the assist ECU 32 and registers the assist key ID in association with the valid period, which are included in the assist key information Dkk, in its memory 17. That is, the verification ECU 5 registers the code string of the assist key ID for the assist key 31 and the number of days of the valid period in the memory 17.

When the registration of the assist key ID to both the assist key 31 and the verification ECU 5 is completed, the assist ECU 32 cancels the locked state of the key cylinder 47 (rotor 49) (step 113). More specifically, the assist ECU 32 activates the solenoid 60 and pulls in the movable pin 61 of the solenoid 60. This releases the movable pin 61 from the rotor 49 and unlocks the key cylinder 47 (rotor 49). That is, the rotor 49 becomes rotatable and thereby allows the assist key 31 to be turned in the key cylinder 47.

Accordingly, after setting the assist key level, the user is allowed to turn the assist key 31 to the unlock position (in the counterclockwise direction as viewed in FIG. 2) relative to the key cylinder 47. When the micro-switch 64 detects that the rotor 49 has been rotated to the unlock position, the assist ECU 32 deactivates the solenoid 60. This projects the movable pin 61 of the solenoid 60. However, the pocket 63 is not located at a position where it is engageable with the movable pin 61. Accordingly, the movable pin 61 is not caught in the pocket 63, and the rotor 49 is allowed to rotate.

When the rotor 49 is located at the unlock position, the tumblers 52 face toward the clearance recesses 58 and are thus allowed to move vertically. This allows for the assist key 31 to be removed from the key cylinder 47. The user removes the assist key 31 from the key cylinder 47 and gives the assist key 31 to the person to whom the vehicle 1 is lent (step 114). When the key detection switch 51 detects that the assist key 31 has been removed from the key cylinder 47, the assist ECU 32 shifts to the assist key restriction mode (step 115). In this state, restricted conditions are imposed for usage of the vehicle functions when operating the vehicle 1 with the assist key 31.

The assist ECU 32 monitors the removal of the assist key 31 from the key cylinder 47, which is in an unlock state, to check that the assist key 31 is not forgotten. For example, the assist ECU 32 measures with a counter the elapsed time from when the key cylinder 47 (rotor 49) is switched to an unlocked state. In this case, if an OFF signal is not received from the micro-switch 64 even though the limit for the elapsed time passes by, the assist ECU 32 determines that the assist key 31 is still left at the lock position. Then, the assist ECU 32 deactivates the solenoid 60 and pushes the movable pin 61. This engages the movable pin 61 with the pocket 63 of the rotor 49 and returns the key cylinder 47 (rotor 49) to the locked state.

Further, if the rotor 49 has been rotated to the unlock position and the time measured from when the key cylinder 47 switches to an unlocked state exceeds the limit time, the key detection switch 51 detects that the assist key 31 is still inserted in the key cylinder 47. In this case, the assist ECU 32 issues a message on the display 36 of the car navigation system 35 to notify that the assist key 31 has not been removed. For example, the display 36 may show a message that reads "assist key not removed". In this case, the assist ECU 32 forcibly ends all tasks for setting the assist key level that have been performed until the present point of time and instructs the user to redo the setting tasks.

The person who borrows the assist key 31 may lock and unlock the vehicle doors with the assist key 31. Such locking and unlocking is performed through a mechanical operation that uses the key plate ala of the assist key 31. Further, a person who borrows the assist key 31 may also start the engine 18. The engine starting is performed by holding the assist key 31 in the vicinity of the engine switch 19. More specifically, the immobilizer antenna 28 of the immobilizer system 26 is arranged in the engine switch 19. When a door opens, the immobilizer antenna 28 starts to transmit the drive radio waves Skd. Thus, by holding the assist key 31 in the vicinity of the engine switch 19, the verification ECU 5 executes immobilizer verification with the immobilizer ECU 27.

During the immobilizer verification, the verification ECU 5 verifies the assist key 31 by comparing the assist key ID received from the assist key 31 with the assist key ID registered in the memory 17. The verification ECU 5 further determines whether the received assist key ID is still valid. If the assist key ID registered in the memory 17 is still valid, the verification ECU 5 determines that the assist key 31 is authentic, or verified. Then, the verification ECU 5 permits usage of the vehicle 1 under restricted conditions.

For example, the assist ECU 32 measures with a counter the elapsed time from when the vehicle 1 shifts to the assist key restriction mode. Then, the verification ECU 5 compares the elapsed time with the valid period set by the valid period setting screen 74 to determine whether or not the assist key ID registered in the assist key 31 is usable. When the assist key ID is received from the assist key 31 after the elapsed time exceeds the valid period, the verification ECU 5 invalidates the assist key ID and prohibits vehicle operations with the lent assist key 31.

Figure 17:
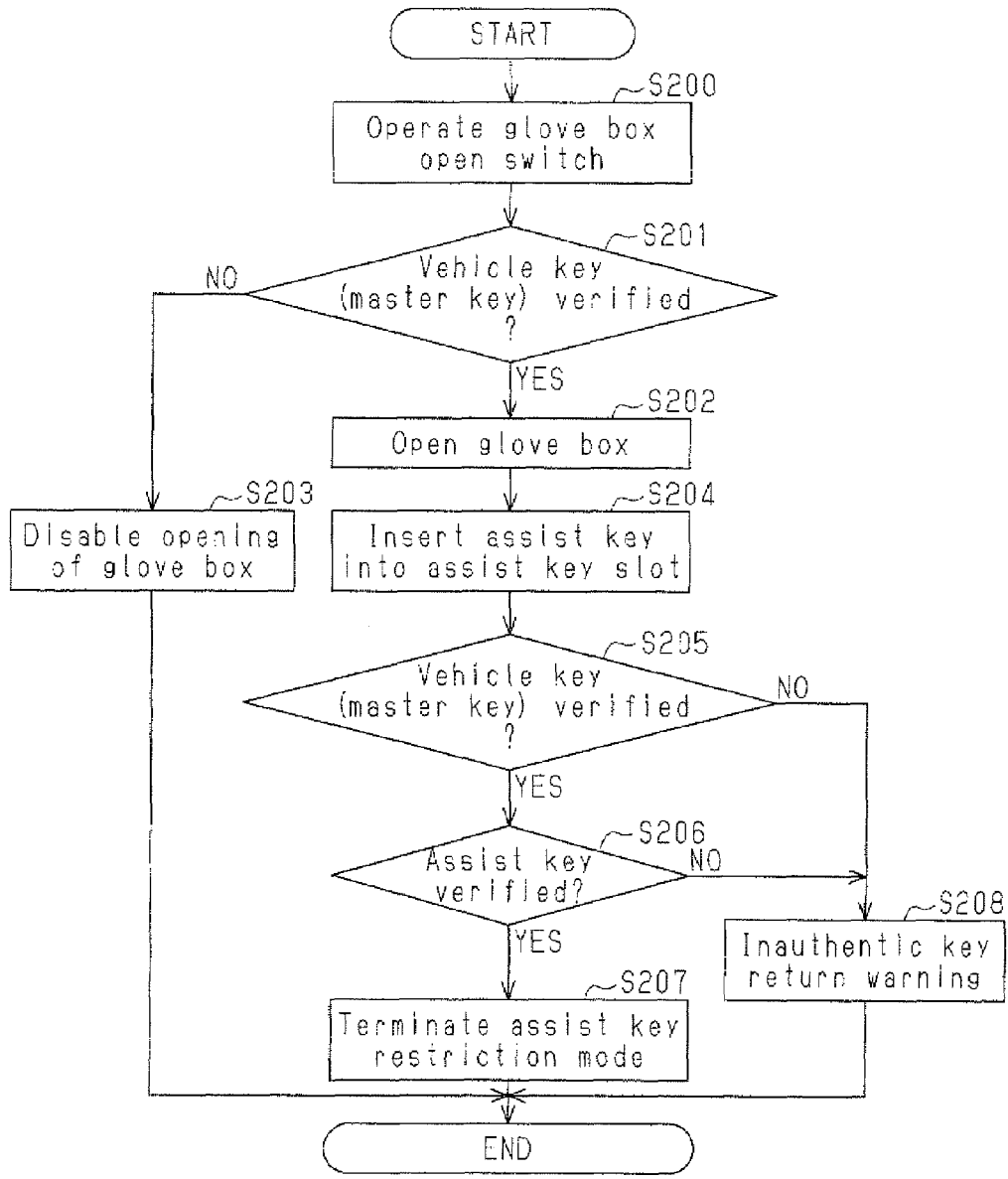
FIG. 17 is a flowchart showing a process performed when returning the assist key.

Next, a case in which the assist key 31 that was lent to a third person is returned to the key cylinder 47 will now be discussed. In this case, the user enters the vehicle 1 while holding the electronic key 2 (master key) so as to perform in-vehicle verification on the electronic key 2. As shown in the flowchart of FIG. 17, the person to whom the vehicle 1 was lent returns the assist key 31 to the user. Then, the user pushes the glove box switch 43 to open the glove box 42 (step 200).

When the glove box switch 43 is pushed, the assist ECU 32 obtains the in-vehicle verification result from the verification. ECU 5 (step 201). If the in-vehicle verification was successful, the assist ECU 32 operates the glove box lock 44 to open the glove box 42 and expose the key cylinder 47 from the glove box 42 (step 202). If the in-vehicle verification was not successful, the assist ECU 32 does not operate the glove box lock 44 and keeps the glove box 42 closed (step 203). Thus, a third person who is not carrying the electronic key 2 is not allowed to open the glove box 42. For example, the third person may open the glove box 42 to remove an item from the glove box 42 instead of inserting the assist key 31 in the key cylinder 47. However, the in-vehicle verification result of the electronic key 2 (master key) is also checked in such a case. This ensures a high level of security.

After opening the glove box 42, the user inserts the assist key 31 into the key cylinder 47. Then, the user turns the assist key 31 in the key cylinder 47 from the unlock position to the lock position (step 204). As a result, the assist ECU 32 detects insertion of the assist key 31 into the key cylinder 47 with the key detection switch 51. Afterwards, the assist ECU 32 performs immobilizer verification on the returned assist key 31 to determine whether or not the inserted key is authentic.

More specifically, referring to FIG. 1, the assist ECU 32 transmits the drive radio waves Sky from the immobilizer antenna 67. The ID tag 66, which is activated in response to the drive radio waves Skv, returns the key ID signal Stb that includes the assist key ID, which is its key code, to the vehicle 1 in the LF band. The assist ECU 32 receives the key ID signal Stb with the immobilizer antenna 67 and performs the immobilizer verification with the assist key ID in the signal Stb. In this manner, the assist ECU 32 and the assist key 31 verify the assist key 31. This checks whether or not a dummy key or the like is inserted into the key cylinder 47.

The assist key ECU 32 detects with the micro-switch 64 that the assist key 31 inserted into the key cylinder 47 has been turned to the lock position. As a result, the assist ECU 32 re-acquires the in-vehicle verification result of the electronic key 2 (master key) from the verification ECU 5 (step 205).

When receiving a successful in-vehicle verification result from the verification ECU 5, the assist ECU 32 determines whether or not verification of the assist key 31 has been successful (step 206). When verification of the assist key 31 is successful, the assist ECU 32 ends the assist key restriction mode (step 207). In this state, the assist ECU 32 provides the verification ECU 5 with a mode completion termination Dnd, which is for notifying that the assist key restriction mode has been terminated. The mode termination notification Dnd is an instruction for deleting the assist key ID from the memory 17 when the assist key restriction mode is terminated. When receiving the mode termination notification Dnd from the assist ECU 32, the verification ECU 5 deletes the assist key ID from the memory 17 to prohibit vehicle operations with the assist key 31. The assist key ID registered in the ID tag 66 of the assist key 31 may be deleted at a timing in which the assist key restriction mode is cancelled.

When the rotor 49 of the key cylinder 47 is rotated to the lock position, the movable pin 61 of the solenoid 60 faces toward the pocket 63 of the rotor 49. Thus, the distal end of the movable in 61 becomes engaged with the pocket 63. As a result, the movable pin 61 restricts rotation of the rotor 49 to the unlock position. That is, the key cylinder 47 is switched to a locked state. This holds the assist key 31 in the key cylinder 47, and the assist key 31 cannot be removed from the key cylinder 17.

When receiving an unsuccessful in-vehicle verification result from the verification ECU 5 in step 205, the assist key ECU 32 determines that key return conditions have not been satisfied and does not accept key return. Further, if verification of the assist key 31 is unsuccessful in step 206, the assist ECU 32 also determines that the key return conditions have not been satisfied and does not accept key return. In these cases, the assist ECU 32 determines that the key inserted into the key cylinder 47 is inauthentic and activates the warning buzzer 71 in the vehicle 1 to issue a warning indicating the return of an inauthentic key (step 208).

In this example, when performing a lending process of the assist key 31 (assist level setting), the key cylinder 47 is used for selective removal of the assist key 31. The holding mechanism for the assist key 31, which is switched between a key removable state and a key irremovable state, uses the key cylinder 47, which is a simple component. This simplifies the key holding structure. Further, the key cylinder 47, which is a widely used component, is inexpensive and easy to obtain.

The key holding structure of the preferred embodiment has the advantages described below.

(1) The key cylinder 47 holds the assist key 31 in a removable state while preventing unauthorized removal of the assist key 31. This simplifies the structure for holding the assist key 31.

(2) The micro-switch 64 detects whether the rotor 49 of the key cylinder 47 is located at the lock position or the unlock position. This allows determination of whether the rotor 49 is located at the lock position or the unlock position based on the detection signal of the micro-switch 64. Thus, for example, when returning the assist key 31 to the key cylinder 47, it can be determined whether the assist key 31 (rotor 49) that has been inserted into the key cylinder 47 has been properly turned to the lock position.

(3) The vehicle 1 shifts to the assist key restriction mode when the key detection switch 51 detects that the assist key 31 (rotor 49) has been removed from the key cylinder 47 at the unlock position. Thus, the operation mode of the vehicle 1 is switched to the assist key restriction mode at an optimal timing at which the assist key 31 is removed from the key cylinder 47.

(4) The vehicle 1 includes the assist key 31, which is used as a vehicle key that is lent to a third person when lending the vehicle 1 to the third person. The assist key system 30 allows for various vehicle usage restriction conditions to be set in accordance with the person to whom the vehicle 1 is lent. Thus, when lending the vehicle 1 to a third person, the appropriate usage restriction conditions may be set in accordance with who the present third person is. This increases the versatility of vehicle lending system that restricts the lending and usage of the vehicle 1.

(5) Whenever the assist key ID is registered to the assist key 31, a key code, or code string, of the assist key ID is changed. For example, when the assist key 31 is performing wireless communication with the vehicle 1, the assist key ID may be intercepted. In such a case, when the assist key 31 is lent again, verification would not be successful when using the previous assist key ID. Thus, even if a person who intercepted the assist key 31 attempts to move the vehicle, he or she would not be able to move the vehicle 1. This lowers the probability of the vehicle 1 being stolen by a person who intercepts the key code.

(6) When lending the vehicle 1 to a third person, the electronic key 2 (master key) must be verified to remove the assist key 31 from the key cylinder 47. Thus, the electronic key 2 (master key) is necessary to shift the vehicle 1 to the usage restriction state. This prevents the vehicle from being shifted to the usage restriction state without the user knowing.

(7) The usage period of the assist key 31, or the valid period for restricted use of the vehicle 1, is set. When the valid period expires, the assist key 31 may no longer move the vehicle 1. This prevents the person to whom the assist key 31 is lent from continuously using the vehicle 1 and lowers the probability of the vehicle 1 being stolen.

(8) The assist ECU 32, which is installed in the vehicle 1, registers the assist key ID to the assist key 31 and to the vehicle 1. This allows for the assist key 31 to be used under restricted conditions as a vehicle key for the vehicle 1. In this manner, the vehicle 1 functions as a master and performs ID management such as registration and deletion of the assist key ID. Thus, the assist key 31 does not have to implement an ID management function. Since the assist key 31 does not have to implement a complicated function, the structure of the assist key 31 may be simplified.

(9) The assist key 31 is accommodated in the glove box 42. To unlock the glove box 42, the electronic key 2 (master key) must be verified. That is, a person must be in possession of the electronic key 2 (Master key) to remove the assist key 31 from the glove box 42. This prevents the glove box 42 from being open without the user knowing. Thus, it would be difficult to remove the assist key 31 from the vehicle 1 without the user knowing.

(10) The assist key 31 is allowed to be retuned to the key cylinder 47 when it is verified. When returned, the immobilizer antenna 67 starts transmitting the drive radio waves Sky as soon as the assist key 31 is inserted into the key cylinder 47. Thus, even though it is determined whether or not verification has been successful when the assist key 31 is returned, the drive radio waves Sky do not have to be constantly transmitted from the immobilizer antenna 67. This reduces the power required for radio wave transmission and saves energy.

It should be apparent to those skilled in the art that the present invention may be embodied in many other specific forms without departing from the spirit or scope of the invention. Particularly, it should be understood that the present invention may be embodied in the following forms.

The actuator for the rotational position holding mechanism 59 is not necessarily limited to a pull solenoid. For example, a solenoid that pulls and pushes the movable pin 61 may be used instead.

The actuator for the rotational position holding mechanism 59 is not limited to the solenoid 60. For example, a motor may be used instead.

The rotational position holding mechanism 59 is not limited to a structure switched between a locked state and an unlocked state by the engagement with the movable pin 61 of the solenoid 60. For example, when the rotor 49 is rotated to the lock position, the rotor 49 may be snapped into a lock position and become locked. In this case, a drive source such as a solenoid or a motor may be used to unlock the rotor 49 and allow the assist key 31 to be turned to the unlock position.

When the rotor 49 is unlocked, the rotor 49 may be returned to its original unlock position by an urging member arranged between the rotor case 48 and the rotor 49.

The angle of the rotor 49 when the assist key 31 is located at the lock position does not have to be separated by about 90 degrees from the unlock position. This angle may be varied.

The timing at which the vehicle 1 shifts to the assist key restriction is not limited to when the assist key 31 is removed from the key cylinder 47 after completing the setting of the assist key level. For example, the vehicle 1 may shift to the assist key restriction level when the setting of the assist key level is completed. In this case, for example, the assist key restriction mode is forcibly terminated when the time during which the use removes the assist key 31 from the key cylinder 47 exceeds a limit time.

The function for setting the assist key level is not necessarily required and may be eliminated.

The rotational positions of the rotor 49, that is, the lock position and the unlock position do not necessarily have to be detected by the single micro-switch 64. For example, discrete switches may be arranged at the lock position and the unlock position. This allows for the rotational position of the rotor 49 to be determined with further accuracy.

The rotational position of the rotor 49 (detected rotational position) does not necessarily have to be detected by the micro-switch 64. For example, various types of switches and sensors, such as a magnetic sensor or an optical sensor, may be used instead. The same applies for the key detection switch 51.

The assist ECU 32 does not have to be discrete from the verification ECU 5. For example, the functions of the two ECUs 5 and 32 may be integrated into a single ECU.

In the preferred embodiment, the assist ECU 32 stops accepting the assist key ID to prohibit vehicle operations with the assist key 31 when the valid period of the assist key ID expires. However, this process may be changed in the following manner. When the period from when the assist key ID is registered to the assist key 31 exceeds a predetermined period, the assist key 31 may refrain from transmitting the assist key ID to prohibit use of the vehicle. That is, the management of the valid period does not necessarily have to be performed by the vehicle 1 and may be performed by the assist key 31.

The input system and display system of the assist key system 30 does not necessarily have to be used commonly with the car navigation system 35 and an exclusive input system and display system may be used instead.

The input system of the assist key system 30 is not necessarily limited to a touch panel type and may be mechanical switch such as a push switch or a rotary switch.

The assist key 31 does not necessarily have to transmit key codes with radio waves and may be, for example, a magnetic card. A magnetic card is defined as a card that includes a magnetic recording unit and records or reproduces various types of information using external magnetic force.

The assist key ID does not necessarily have to be changed whenever registered to the assist key 31 and may be a code string that changes in accordance with the person to whom the assist key 31 is lent. Further, a single code string may be shared for a plurality of assist key levels. In this case, when lending the assist key 31 to a third person, the assist key ECU 32 holds at least one assist key level that is in accordance with the present demands.

The assist key ID does not necessarily have to be a key code that changes in accordance with the person to whom the vehicle 1 is lent. For example, the assist key ID may include a functional code describing the contents of a key code included in the assist key ID, and the functional code may be employed to use a single assist key ID in different manners.

The REID communication does not necessarily have to use signals in the LF band and may use signals in the RF band.

The time for performing input operations in the assist key level selection mode and the assist key level return mode may be restricted so that when the input time exceeds the limit time, the input operations are forcibly terminated.

The input buttons in the screens 70, 72, and 74 do not have to be buttons for incrementing or decrementing numerical values and may be, for example, a plus (+) key.

The in-vehicle verification, which must be successful to lend or return the assist key 31, is not limited to a format that transmits through wireless communication a code string formed by numbers having a predetermined regularity or random marks. For example, biometric authentication using fingerprints as a verification tool may be employed.

The electronic key system 3 may be a wireless key system installed in the vehicle 1. In such a wireless key system, when a lock button or unlock button of the electronic key 2 is operated, a wireless signal of which contents is in accordance with the operated button is transmitted from the RF transmitter 16 in the low RF band to the vehicle 1 through narrowband wireless communication to lock and unlock the doors.

The assist key 31 does not necessarily have to include the ID tag 66 and be provided with an electronic key function and may just be a mechanical key.

The assist key 31 is not necessarily limited to a key that restricts vehicle usage and may be a key that allows the vehicle 1 to be freely used in the same manner as a master key.

The present examples and embodiments are to be considered as illustrative and not restrictive, and the invention is not to be limited to the details given herein, but may be modified within the scope and equivalence of the appended claims.

What is claimed is:

1. An electronic key system for operating a vehicle, comprising:
    a master key, an auxiliary key, and an in-vehicle key holding device for said auxiliary key, the key holding device comprising:
    a key cylinder capable of retaining the auxiliary key which is a vehicle key that is not a master key;
    a rotor rotatably arranged in the key cylinder, in which the auxiliary key is insertable into the rotor;
    a tumbler rotatable with the rotor in the key cylinder, in which the tumbler holds the auxiliary key in a manner irremovable from the key cylinder in accordance with the rotational position of the rotor;
    a key lock mechanism capable of locking the rotor in a state in which the tumbler holds the auxiliary key in a manner irremovable from the key cylinder;
    a control unit for switching the rotor between a locked state and an unlocked state by controlling the key lock mechanism so as to permit removal of the auxiliary key when the rotor is in the unlocked state; and
    a restriction setting unit that controls whether vehicle functions are usable with the auxiliary key in accordance with a selection of a user, wherein the vehicle functions are usable with the master key, but not all of the vehicle functions are usable with the auxiliary key.

2. The electronic key system for operating a vehicle according to claim 1, wherein the control unit comprises:
    a rotational position detection unit which detects the rotational position of the rotor and generates a detection signal; and
    a rotational position checking unit which receives the detection signal of the rotational position detection unit and determines whether the rotational position of the rotor is a key unlock position at which the auxiliary key is removable from the key cylinder or a key lock position at which the auxiliary key is irremovable from the key cylinder.

3. The electronic key system for operating a vehicle according to claim 1, further comprising:
    a key detection unit which detects whether or not the auxiliary key is inserted into the key cylinder, wherein the restriction setting unit shifts an operation mode of the vehicle to a lending mode that restricts use of vehicle functions when the key detection unit detects removal of the auxiliary key from the key cylinder.

4. The electronic key system for operating a vehicle according to claim 1, wherein:
    the auxiliary key is an electronic key capable of transmitting a wireless signal that includes a unique key code, and use of the vehicle functions with the auxiliary key is permitted when the key code of the auxiliary key is in conformance with a key code stored by the restriction setting unit; and
    the restriction setting unit registers the key code of the auxiliary key in both the vehicle and auxiliary key and changes the key code of the auxiliary key in accordance with a user selection whenever registering the key code, thereby changing the restricted condition of the vehicle functions.

5. The electronic key system for operating a vehicle according to claim 1, further comprising:
    a verification unit which verifies the master key;
    wherein the restriction setting unit allows the auxiliary key to be lent to another person when the master key is verified.

6. The electronic key system for operating a vehicle according to claim 1, wherein the control unit comprises:
    a valid period setting unit which sets a valid period for use of the vehicle with the auxiliary key.

7. The electronic key system for operating a vehicle according to claim 4, wherein the restriction setting unit is arranged in the vehicle and manages the key code of the auxiliary key from the vehicle.

8. The electronic key system for operating a vehicle according to claim 1, further comprising:
    an accommodation compartment arranged in the vehicle to accommodate the key cylinder and having a lockable lid; and
    a verification unit which verifies the master key; wherein the verification unit unlocks the lid of the accommodation compartment when the master key is verified.

9. The electronic key system for operating a vehicle according to claim 4, wherein the restriction setting unit starts transmitting the wireless signal that includes the key code as soon as the auxiliary key is inserted into the key cylinder.

* * * * *